US008892549B1

(12) United States Patent
Thakur

(10) Patent No.: US 8,892,549 B1
(45) Date of Patent: Nov. 18, 2014

(54) RANKING EXPERTISE

(75) Inventor: Shashidhar A. Thakur, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1538 days.

(21) Appl. No.: 11/772,022

(22) Filed: Jun. 29, 2007

(51) Int. Cl.
*G06F 17/30* (2006.01)
*G06F 7/00* (2006.01)

(52) U.S. Cl.
USPC .......................................... 707/728; 707/748

(58) Field of Classification Search
CPC .............. G06F 17/277; G06F 17/2785; G06F 17/30864; G06F 17/30616
See application file for complete search history.

(56) References Cited

U.S. PATENT DOCUMENTS

| | | | | |
|---|---|---|---|---|
| 5,500,920 | A * | 3/1996 | Kupiec ........................ | 704/270.1 |
| 7,243,109 | B2 * | 7/2007 | Omega et al. ................. | 707/102 |
| 7,395,222 | B1 * | 7/2008 | Sotos ........................... | 705/7.34 |
| 7,529,735 | B2 * | 5/2009 | Zhang et al. .................. | 1/1 |
| 8,176,041 | B1 * | 5/2012 | Harinarayan et al. ........ | 707/722 |
| 2005/0108281 | A1 * | 5/2005 | Kim et al. ................... | 707/104.1 |
| 2006/0025962 | A1 * | 2/2006 | Ma et al. ...................... | 702/182 |
| 2006/0200442 | A1 * | 9/2006 | Parikh .............................. | 707/1 |
| 2006/0277465 | A1 * | 12/2006 | Pandit et al. .................. | 715/531 |
| 2007/0150468 | A1 * | 6/2007 | Goldman et al. ................ | 707/5 |
| 2008/0140616 | A1 * | 6/2008 | Encina et al. .................... | 707/3 |

* cited by examiner

*Primary Examiner* — Sangwoo Ahn
(74) *Attorney, Agent, or Firm* — Fish & Richardson P.C.

(57) ABSTRACT

Methods, systems and apparatus, including computer program products, for ranking expertise. In some implementations a method is provided that includes identifying a plurality of identities, and identifying a plurality of topics using one or more documents in a repository. For a document in a corpus of documents identifying one or more occurrences of any identity in the plurality of identities and one or more occurrences of any topic in the plurality of topics, determining an association between the identities occurring in the document and the document including deriving an identity score for each unique identity occurring in the document, determining an association between the topics occurring in the document and the document including deriving a topic score for each unique topic occurring in the document, and using the determined associations to derive a score of the document with respect to identities and topics occurring in the document.

42 Claims, 7 Drawing Sheets

RANKING EXPERTISE

BACKGROUND

This specification relates to information retrieval for identifying and ranking experts and areas of expertise.

Organizations typically maintain electronic directories of people who are affiliated with the organization and who are associated with particular electronic documents related to activities of the organization. Additionally, each person in the directory may have a profile that lists skills that the given person is considered to have expertise. In some systems, these skills can be statically defined by someone, e.g. a trained administrator. Using a search query to search such a directory for a particular person generally returns a list of people based on how similar a person's name is to the search query. Similarly, using another search query specifying a particular skill generally returns a list of people based on whether words of the search query appear in a profile associated with the person.

SUMMARY

In general, one aspect of the subject matter described in this specification can be embodied in methods that include the actions of identifying a plurality of identities. A plurality of topics is identified using one or more documents in a repository. For a document in a corpus of documents, one or more occurrences of any identity in the plurality of identities and one or more occurrences of any topic in the plurality of topics are identified. An association between the identities occurring in the document and the document is determined. Determination of this association includes deriving an identity score for each unique identity occurring in the document. An association between the topics occurring in the document and the document is determined. Determination of this association includes deriving a topic score for each unique topic occurring in the document. The determined associations are used to derive a score of the document with respect to identities and topics occurring in the document. Other embodiments of this aspect include corresponding systems, apparatus, and computer program products.

These and other embodiments can optionally include one or more of the following features. The repository can include the corpus of documents. Identifying a plurality of topics can include identifying a plurality of n-grams from documents in the repository. An inverse document frequency (IDF) score can be determined for each n-gram. The n-grams can be sorted by IDF score to identify topics corresponding to one or more of the n-grams. Deriving the identity score for a particular identity can include deriving the identity score based on features of a reference to the identity occurring in the document. Features of a reference to the identity can include one or more of a location within the document of the reference and typographical properties of the reference. Deriving the identity score for a particular identity can include deriving the identity score based on a frequency of references to the identity occurring in the document. Deriving the topic score for a particular topic can include deriving the topic score based on features of the occurrence of the topic in the document. Features of a topic can include one or more of a location within the document of the reference and typographical properties of the reference.

Another aspect of the subject matter described in this specification can be embodied in methods that include the actions of receiving a search query where the search query is determined to match an identity among a plurality of identities. Multiple topics associated with the identity is identified based on multiple documents in which the identity is referred. Each of the multiple documents pertain to at least one or more of the multiple topics. The multiple topics are ordered based on a number of the multiple documents each topic pertains to. The multiple topics are presented based on the ordering. Other embodiments of this aspect include corresponding systems, apparatus, and computer program products.

These and other embodiments can optionally include one or more of the following features. Topic scores associated with each of the multiple topics can be identified. The topic scores can be based on occurrences of a respective topic in the multiple documents. Identity scores associated with the identity can be identified. Each identity score can be based on references to the identity in the multiple documents. Each topic score in the one or more topic scores associated with each of the multiple topics can be derived based on features of each occurrence of the respective topic in a document of the multiple documents. Each identity score associated the identity can be scored based on features of each occurrence of references to the identity in a document of the multiple documents. The multiple topics can be ordered based on a composite score associated with each of the multiple topics. The composite score of a topic can be based on the identity scores of the identity and the one or more topics score associated with the topic Presenting the multiple topics can include presenting for each of the multiple topics one or more of the multiple documents, where the one or more of the multiple documents are the documents that are most relevant to the corresponding topic. The plurality of identities can be identified from one or more directories.

Another aspect of the subject matter described in this specification can be embodied in methods that include the actions of receiving a search query where the search query is determined to match a topic among a plurality of topics. Multiple identities associated with the topics are identified based on multiple documents in which the topic is referred. Each of the multiple documents pertain to at least one or more of the multiple identities. The multiple identities are ordered based on a number of the multiple documents each identity is referenced in. The multiple identities are presented based on the ordering. Other embodiments of this aspect include corresponding systems, apparatus, and computer program products.

These and other embodiments can optionally include one or more of the following features. Identity scores associated with each of the multiple identities can be identified. The identity scores can be based on references of a respective identity in the multiple documents. Topic scores associated with the topic can be identified. Each topic score can be based on occurrences to the topic in the multiple documents. Each identity score in the one or more identity scores associated with each of the multiple identities can be derived based on features of each occurrence of a reference to the respective identity in a document of the multiple documents. Each topic score associated the topics can be derived based on features of each occurrence of the topic in a document of the multiple documents. The multiple topics can be ordered based on a composite score associated with each of the multiple topics. The composite score of a topic can be based on the identity scores of the identity and the one or more topics score associated with the topic. Presenting the multiple identities can include presenting for each of the multiple identities one or more of the multiple documents where the one or more of the multiple documents are documents that are most relevant to the corresponding identity. The plurality of topics can be identified from a corpus of documents.

These and other embodiments can be implemented to provide one or more of the following advantages. Experts are ranked according to their expertise in a given topic. Expertise of an expert in a particular topic is established according to an expert's involvement in documents pertaining to the topic, for example, participation in authoring and editing the documents. Extent of expertise is established not only by the quantity of documents an expert has been involved with, but by the quality of the expert's involvement (e.g., based on whether the export authored a document or edited it). The topic of a document and the people related to the document are identified automatically from content of the document. The various aliases of a person (e.g., e-mail addresses, usernames, full name, or nicknames) are effectively merged together to establish a unified record of expertise for the person. The expertise of experts is always up-to-date, reflecting the current state of the documents, even as they change over time. Both experts in a given topic and the expertise of a given person can be ranked and retrieved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
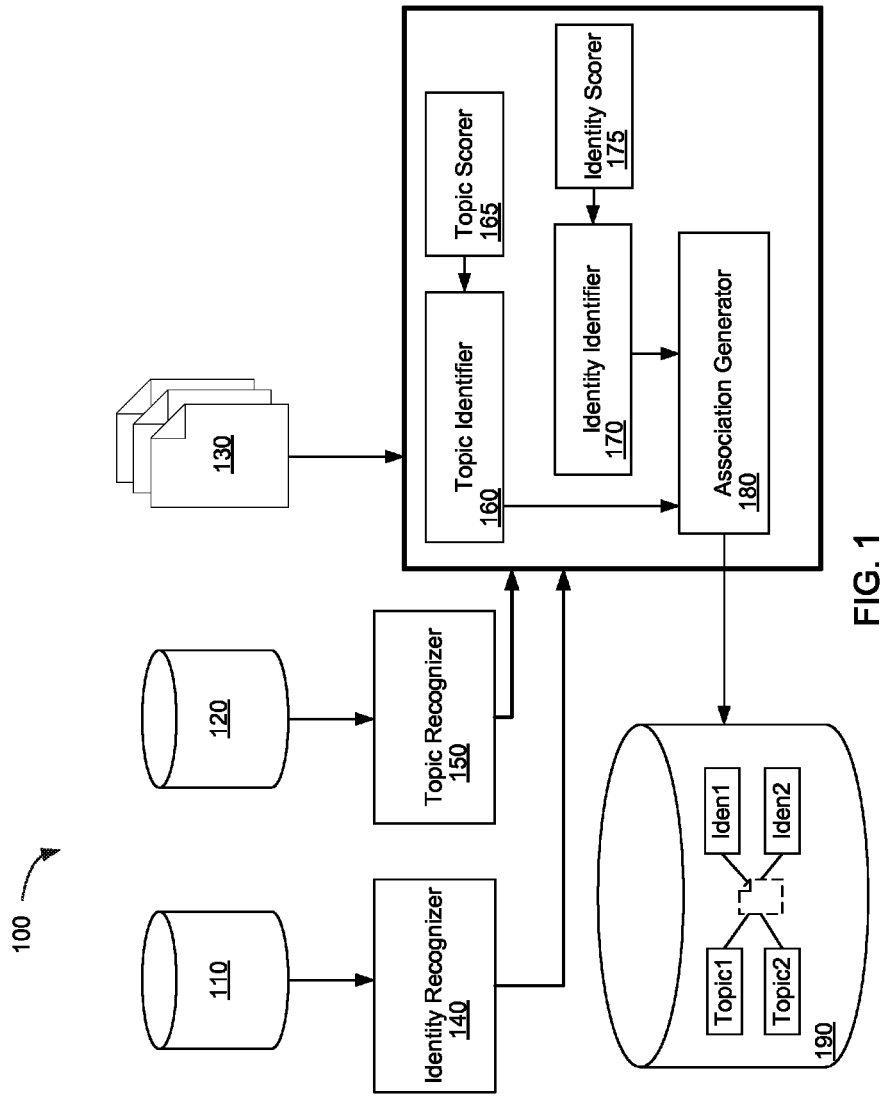
FIG. 1 is a block diagram of an exemplary expertise ranking system.

FIG. 1 is a block diagram of an exemplary expertise ranking system 100. The system 100 includes a repository of identities 110 and a corpus of documents 130. The repository of identities 110 is an information source from which individuals, organizations, or other entities are identified. Each identity can correspond to an expert having expertise in particular areas (referred to as a topic of expertise or simply a topic). Each identity derived from the repository of identities includes one or more aliases used to refer to each identity (e.g., name (first, last, or both), employee number, email address, nicknames, usernames or other synonyms used to identify a particular identity).

In some implementations, the repository of identities 110 is a corporate directory of employees. For example, a corporate directory of employees can be maintained in an LDAP (lightweight directory access protocol) database. In general, the repository of identities 110 may include variety of sources including for example, telephone directories, email address books, a user-base associated with a knowledge repository (e.g., wiki or knowledge base), information associated with documents in the corpus of documents 130 (e.g., author, editor and publisher meta-data). An identity recognizer 140 is a module of the system 100. The identity recognizer 140 recognizes individual identities, and each identity's associated aliases, from the repository of identities 110. The individual identities are likely to have authored or otherwise been involved in the creation of documents in the corpus of documents 130. Thus, the repository of identities 110 and the corpus of documents 130 are related to each other. For example, both the repository of identities 110 and the corpus of documents 130 is maintained by the same organization.

The corpus of documents 130 includes a variety of electronic document (e.g., conventional electronic documents, web pages, personal homepages, profile pages, wiki pages, entries of a database, or other identifiable text). The corpus of documents 130 can correspond to documents in a corporate repository of documents (e.g., a database or knowledge repository), or documents accessible on a network or file system (e.g., a corporate internet or one or more network storage devices). Generally each document includes text content and has a location identifier (e.g., path and file name, or universal resource locator (URL)). Documents optionally include, or are associated with, additional information including content formatting, edit and revision history, and meta-data (e.g., a list of authors, a list of editors, category keywords, abstract, and date of publication).

The system 100 includes a repository of information 120 from which topics are derived. Each topic is a word or a sequence of words that potentially describes relevant information about a document in the corpus of documents. Ideally topics can be used to describe a document and helps to distinguish one document from another. As will be described in more detail below, relevant information of a document is identified by searching for the topics within the document.

The repository of information 120 contains electronic documents including, in some implementations, some or all of the documents from the corpus of documents 130. In some implementations, the repository of information 120 is the same as the corpus of documents 130. A topic recognizer 150 derives topics from the documents in the repository of information 120. In some implementations, topics are received from another system or provided by a user.

The topic recognizer 150 derives topics by calculating a score for terms that correspond to individual words (unigrams) or a sequence of words (e.g., bigram, trigram, or n-gram) that occur in the repository of information 120. In some implementations, the score of a term is based on an IDF (inverse document frequency) calculated for each term. The IDF of a particular term can be calculated by counting the number of documents in which the term occurs divided by the total number of documents in the repository of information 120. The exact formulation of the IDF score can be vary among implementations. For example, in one implementation, the IDF score can be calculated using the following formula, where t is the term being considered and C is the repository of information:

$$IDF(t, C) = 1 - \frac{\log(\# \text{ of } docs \text{ containing } t)}{\log(\# \text{ of } docs \text{ in } C)}$$

Since the IDF score considers all of the available documents in repository of information, the IDF score is sometimes referred to as a corpus-IDF score. In other implementations, alternative techniques for scoring terms are used. High scoring terms are scores are selected as topics. In some implementations, a specified number of terms are selected (e.g., the top 500 terms). In other implementations, a proportion of highest scoring terms are selected (e.g., the top 20% of terms).

In some implementations, a user provides a hierarchy of topic categories. In such a hierarchy, each topic can be grouped by a parent topic to define related topics. For example, one parent topic 'database' has many child topics 'relational', 'real-time', 'data-mart' and 'ACID', which are all subtopics of the database topic. The parent topic 'database' may itself by a topic under an 'information organization' grandparent topic. For each category (e.g., parent topic) several representative documents are selected (e.g., by a user) from which terms are derived. These representative documents will be referred to as category documents.

The category documents are used to augment the scoring of a term. The score of the term is determined based on a ratio of the corpus-IDF score of the term, as calculated above, and a category-IDF score of the term. The category-IDF score is based on the number of documents in a particular category in which the term appears divided by the total number of documents in the category. For example, in the above formula given to calculate IDF, C corresponds to only the documents within the category rather than all documents in the corpus as a whole. A descriptive term, which is likely to describe relevant information about a document, is one where the category-IDF is low and the corpus-IDF is high. In other words, the term appears frequently among documents in the category, but very infrequently relative to all of the documents in the repository of information 120. For example, if term 'data' occurs frequently in documents within the database category, but also occurs frequently in all documents, then this term is not likely to be very descriptive. In contrast, if the term 'materialized views' occurs frequently in documents within the database category, but very infrequently in all documents in general, then this term is likely to be descriptive of documents in the category. The topic categories can be used to further improve search results (e.g., by allowing a user to select a particular topic category in addition to the search query or by additionally associating a category topic with a document in the corpus of documents 130).

The system 100 uses topics recognized by the topic recognizer 150 and the identities recognized by the identity recognizer 140 to process each document in the corpus of documents 130. For a given document, a topic identifier 160 determines which, if any, recognized topics occur in the document. If a recognized topic occurs in a document, then the document is determined to pertain, at least in part, to the recognized topic. Likewise, an identity identifier 170 determines which, if any, recognized identities, in particular their respective aliases, occur in the document.

Given a document, a topic scorer 165 scores a topic that occurs in the document based on features of each occurrence of the topic within the document. Features of an occurrence include the location occurrence, typographical formatting, or proximity to other topics or locations (e.g., the beginning of the document). For example, if 'database' is a topic, then the topic identifier 160 may match and identify that 'database' occurs in the title of a document, multiple times in the body of the document, and once in the abstract of the document. For example, the topic may be scored 2.25 points, one point each for the term appearing in the title and in the abstract and 0.05 points for each time the term appears in the body of the document. Thus a document is recognized as having greater relevance to a topic when the topic occurs in the document title compared to an occurrence located in the body of the document. The number of points assigned reflects an estimation of the extent to which the content of the document relates to the topic.

An association generator 180 stores data associating the document with each topic that is identified in the document. Each topic's respective score is recorded with the document-topic association in a database 190. In some implementations, the system stores an association only if the score of the association is sufficiently high (e.g., above a specified threshold). Such a threshold prevents subsequent consideration of low-scoring associations between documents and topics.

The identity identifier 170 matches identities with documents. An identity matches a document when a reference to the identity occurs within the document. Such a referenced is detected when an alias of the identity occurs within the document. For example, if a particular identity is associated with the name 'John Smith', the email address 'jsmith@email.tld' and the username 'jazzer78', then any of these aliases occurring in a document can be used to match the identity with the document.

An identity scorer 175 is used to score identities matched with a document based on occurrences of the aliases in the document. For example, score of 3.2 to the identified identity because 'John Smith' occurs in the author meta-data field of the document (worth a score of 2.1), the address 'jsmith@email.tld' occurs in the text of the document (worth 0.3) and the username 'jazzer78' occurs in the revision log four times (worth 0.2 each time). The scores of each occurrence of the identity are combined (e.g., summed together) to derive the score of 3.2. The identified identities and their associated score are stored in association with the document in the database 190 by the association generator 180. Thus, for each document in the corpus of documents, one or more scored associations can be established between the document and an identity or between the document and a topic. Alternatively, associations can be established directly between identities and topics without intervening associations to the document that were used to derive the topic-identity associations.

Figure 2:
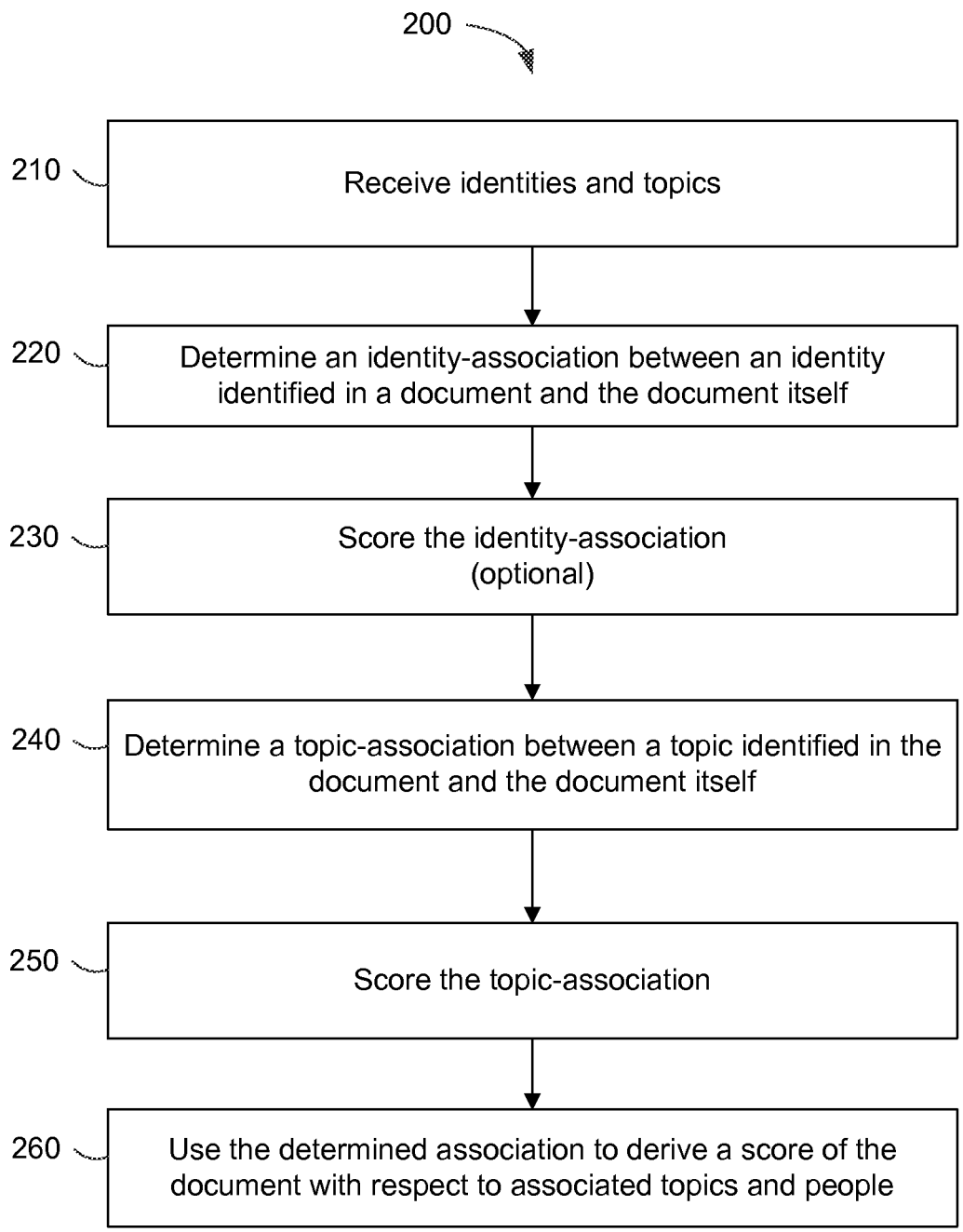
FIG. 2 is a flow diagram of an exemplary process for identifying experts and topics.

FIG. 2 illustrates a process 200 for identifying topics and identities in a document. For convenience, the process 200 will be described with reference to a system that performs the process 200. The document is presumably one of the corpus of documents 130 described in reference to FIG. 1. The system receives several identities and several topics (step 210). As described above, the identities and topics may be derived from the corpus of documents 130 (or from another corpus, for example, the corpus 110 or the corpus 120). The document is processed using the identities and topics to determine which of the identities are associated with the document. The process also determines to which of the topics the document pertains. These determinations are used to create associations between the document and one or more identities (referred to as identity-associations), and between the document and one or more topics (referred to as topic-associations).

The system determines identity-associations for each unique identity occurring in the document (step 220). The given document is searched for aliases of the received identities. An identity-association is created for each identity having one or more aliases that match the document. For example, one document may list an author (e.g., in a meta-data field) by first and last name, thereby causing an identity-association to be created associating that identity and the document. The body of the same document may include an email address of another identity, thereby causing an identity-association to be created associating that identity and the document.

The identity-associations that are created are optionally scored (step 230) based on based on how frequently the a reference to the identity occurs in the document and features of each occurrence (e.g., where in the document the topic occurs or typographical style). In some implementations, identities occurring in the meta-data of the document are scored more highly than other occurrences, particularly if the meta-data explicitly identifies an identity as the author of the document. Identities occurring in the revision history of the document can be scored based on how many revisions the identity is recorded making In some implementations, the size of the revision made by a revisionist can be used to weight the score given to identities determined to have revised a document. The size of the revision can be determined by comparing the previous version of the document, prior to the revision, with the revised document. The number of words or characters removed or added in the vision can be used to measure the size of the revision.

Compared to identities occurring in a meta-data author field, identities that occur in the body of the document are scored more modestly. In some implementations, identities found in the body of the document can be scored more highly if the identity occurs in proximity (e.g., within particular number of words or lines) to an identified title of the document. For example, if an identity is named in the author-meta-data of a document, then the corresponding association is scored with a value of 1.0. An identity occurring in the body of the document can be assigned a score of 0.25, while another identity occurring in the body near the title can be assigned a score of 0.6. In some implementations, the identity-association can also be scored based on how frequently an identity occurs in the document. For example, for an identity named as revising the document, a particular association score, based on location (e.g., 0.2 for revisions), is multiplied by the number of revisions the identity has made. The score of each occurrence can be combined (e.g., summed together) to form a combined for the identity-association. The combined score of the identity-association represents a determination about the degree to which the identity was involved in the creation of the document, or, more generally, how relevant the document is with respect to the identity.

The system determines topic-associations for each topic identified in the document (step 240). The given document is searched for any of several topics. A topic-association is created for each topic that matches the document. For example, one document may include a topic in the meta-data (e.g., an abstract or category keywords) of the document, thereby causing a topic-association to be created that associates the topic with the document. A different topic can occur in the body of the same document, thereby causing another topic-association to be created that associates the different topic with the document.

The systems scores the topic-associations that are created (step 250) based on how frequently the topic occurs in the document and features of each occurrence (e.g., where in the document the topic occurs or typographical style). In general, identities occurring in the title or meta-data of the document are scored more highly than other occurrences. In some implementations, the title of the document is identified from a particular meta-data field. In other implementations, the title is derived automatically from the body of the document (e.g., based on typographical formatting or proximity to the beginning of the document). Compared to topics occurring in title, a topic that occurs in the body of the document is scored more modestly. A particular topic may occur in the location identifier of the document. For example, the topic 'translation' occurs in the location identifier 'http://corp.example/ml_translation/design.html'. Such an occurrence is scored more highly than if the topic occurs in the body of the document. For example, if a topic is named in the meta-data or title of a document, then the corresponding association is scored with a value of 1.0. A topic occurring in the body of the document can be assigned a score of 0.25, while another topic occurring in the location identifier of the document is assigned a score of 0.5. The system sums the score from each occurrence of the topic within the document to derive a single combined score of the topic-association. The combined score of the topic-association represents a determination about the degree to which the document pertains to the topic, or, more generally, how relevant the document is with respect to the topic.

The associations are used derive a score of the document with respect to associated topic and identity combinations (step 260). These scores, and how they can be used, are as described below in reference to FIG. 3. In general, for any one document d, an aggregate score $S_{t,i}$ can be derived for each combination of topic t and identity i associated with the document. The aggregate score is the respective score $w_i$ of the corresponding identity-association i multiplied by the respective score $w_t$ for the corresponding topic-association t, as expressed in the following equation: $S_{t,i} = (w_t)(w_i)$. In some implementations, these scores are stored for later use in responding to search queries. In such implementations, processing the corpus of documents to derive scored associations can occur offline and asynchronously from accepting and responding to queries.

Figure 3:
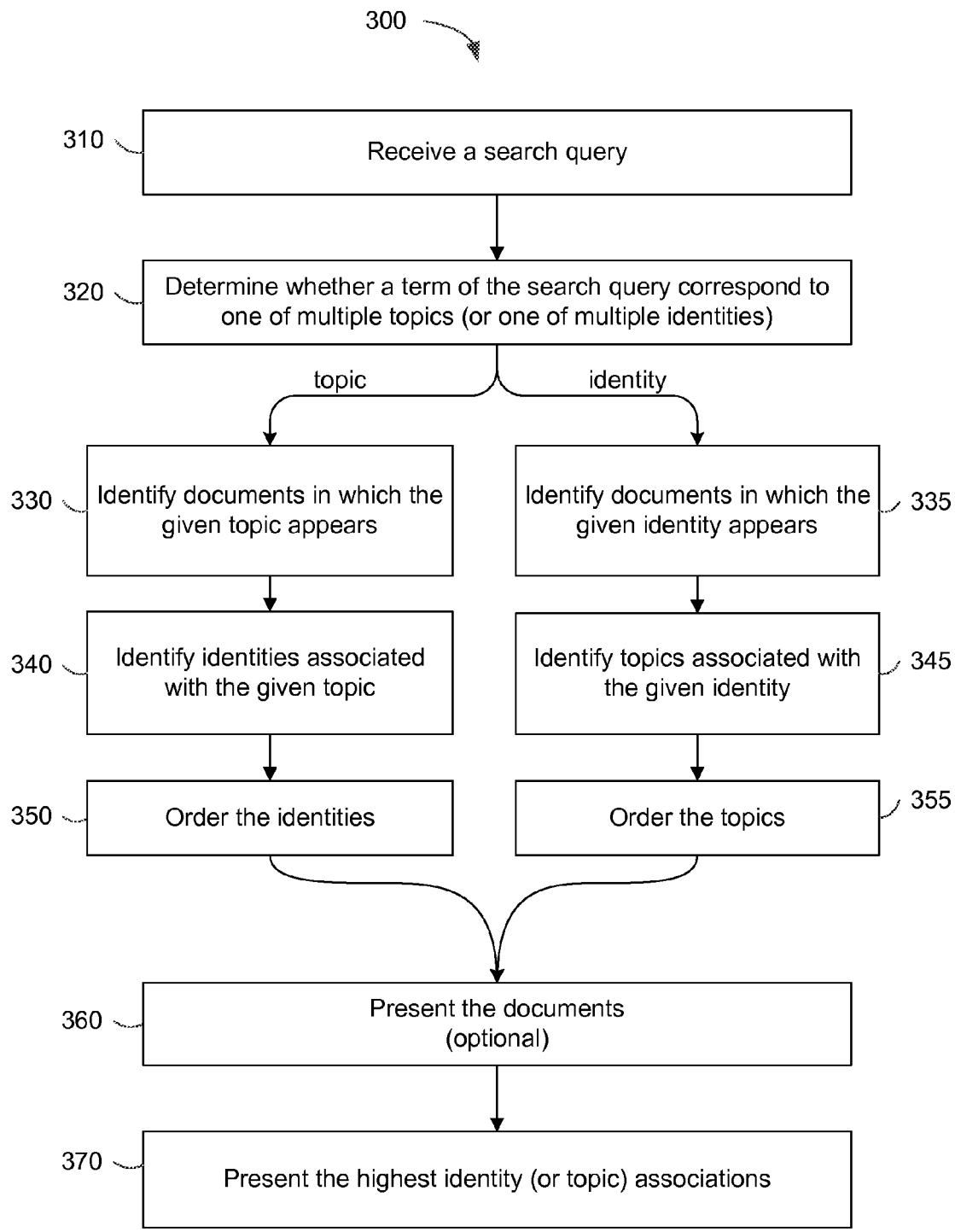
FIG. 3 is a flow diagram of an exemplary process for responding to a search query.

FIG. 3 illustrates an exemplary process 300 for responding to a search query. For convenience, the process 300 will be described with reference to a system that performs the process 300. The system receives a search query (step 310) specified as a string. The system determines whether terms of the query correspond to topics or to identities (step 320). The system determines whether a term is a topic by matching the term with known topics (e.g., topics in the repository of topics). Likewise, the system determines whether the term is an identity by matching the term with known aliases of each identity. In some implementations, a match does not need to be exact. For example, a term is recognized as a particular topic if the term is approximately the same as the topic (e.g., because the identified topic and the term have an edit distance less than a specified value).

In some implementations, when a term is not recognized as a topic or an identity using an exact match, the term is scored with respect to potential candidate topics and to identities (e.g., based on how similar the term is to known topics and identities). Such a term is recognized as a topic if the score indicates that the term is more likely to be a topic than an identity. The term is recognized as an identity otherwise. In other implementations, an indication can be provided to a user requesting that the user select one of multiple potential candidate topics or identities that approximately match the given term.

If the term is a topic, the system identifies documents in which the topic occurs (step 330). Documents can be identified using conventional search techniques. For example, terms of the search query can be used as keywords to query a conventional search engine of the corpus of documents. Alternatively, pre-existing associations, such as those stored in the association database 190, are used to identify documents associated with the topic (or identity) specified by the search query. In some implementations, where associations have been established directly between identities and topics, identifying documents is optional.

Using the identified documents, the system identifies identities associated with the given topic (step 340). Given that the documents are all related to the given topic, any identity associated with the documents are thus associated with the topic. Each unique identity is ordered with respect to other identified identities based on the number of documents the identity is associated with and, in some implementations, the score of the association.

In some implementations, a first identity ranks more highly than a second identity if the first identity is associated with more documents of the given topic. In other implementations, the system determines a composite score for each associated identity. The composite score of an identity is based on the score of each identity-association related to the identity (e.g., a sum of identity-association scores). The composite score can be further based on the score of topic-associations related to the given topic. For example, the composite score of an identity i, given a topic t, is derived using the following formula:

$$\text{score}(i, t) = \sum_{doc} (w_t)(w_i)$$

Thus, for the topic t and the identity i, the composite score is a sum of products. For each identified document doc, which by definition is associated with both the topic and the identity, the score of the document's topic-association $w_t$ is multiplied by the document's identity-association $w_i$. This score is the same as the aggregate score for the given document, identity and topic. The composite score is the sum of the aggregate score over all of the identified documents. Thus, even for a constant corpus of documents, the composite score is dependent on the given identity and topic.

Figure 4:
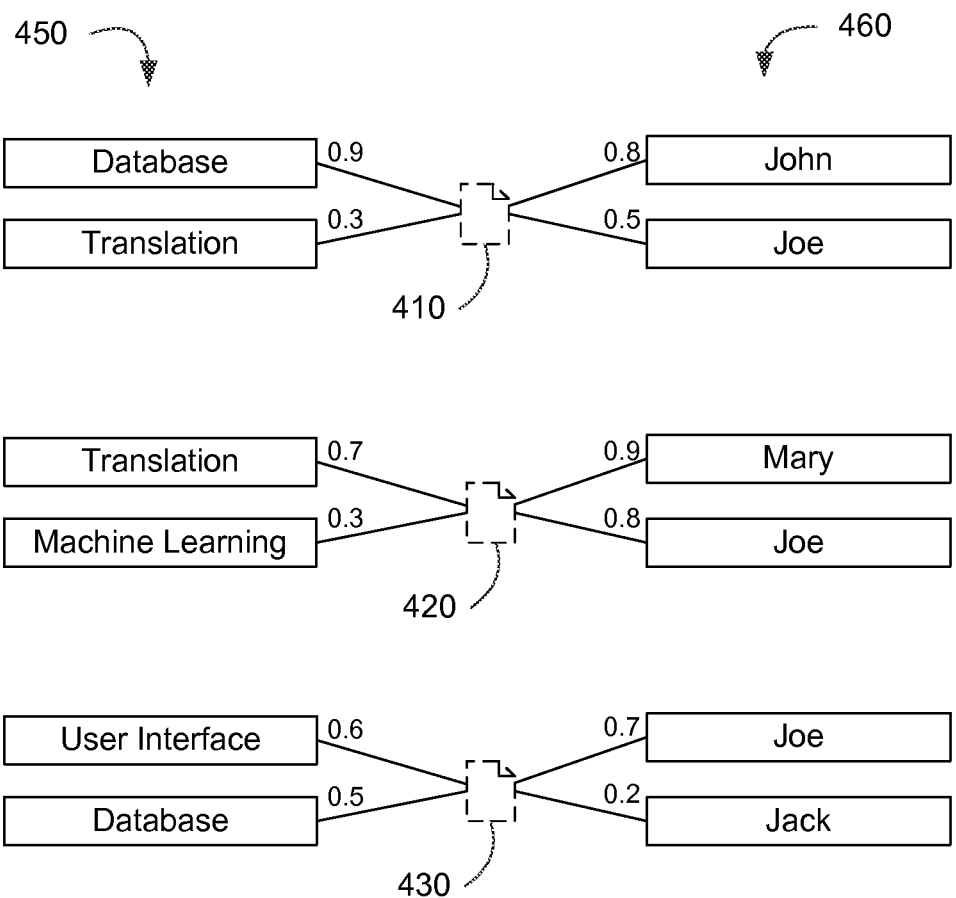
FIG. 4 is a diagram of exemplary associations derived from three documents.

FIG. 4 is a diagram of three exemplary associations derived from three documents (e.g., document 410, document 420, and document 430). Each document is shown with scored associations to topics 450 and identities 460. In some implementations, topics and identities are directly associated. For example, from document 410 two associations can be established for Joe: database and translation, and two associations can be established for John: database and translation.

Presuming that the three documents shown are the only documents in which the topic 'database' occurs, the composite score for Joe with respect to the given topic is the sum of the scores associating Joe and 'database' for each document: 0.9×0.5+0.5×0.7=0.8. Similarly, the composite score for John and Jack are 0.72 and 0.25 respectively.

Thus, the composite score of a given topic and identity rises as the score of the respective associations increase or, alternatively, as the number of documents with both associations increase. For example, Joe's composite score with respect to databases could be increased if his involvement in document 410 had been more substantial, thereby raising the score of Joe's association with document 410. Similarly, Joe's composite score would increase if the document 430 was more relevant to databases, thereby increasing the topic-identity between the database topic and document 430. Alternatively, Joe's composite score would increase if another document (i.e., a fourth document) was added to the corpus and that newly added document was associated with both the database topic and the Joe identity.

Returning to FIG. 3, the system sorts the identities associated with the topic based on their respective scores (step 350). For example, Joe would precede John who would precede Jack in order of their respective composite scores. In implementations where associations are not scored, identities are ordered based on the number of associations each identity has to the topic—in other words, the number of documents related to the topic that the identity is associated with. Such an approach is equivalent to presuming the score between all associations has a value of one. Thus, Joe would be precede John and Jack, who would both be ordered equivalently because they are both associated to only one document that is associated with the topic 'database'.

The preceding discussion presumes a topic is specified by the search query. When an identity is specified in the search query, topics are identified and scored in an exactly analogous manner. Thus, when the search term specifies an identity, documents in which the identity occur are optionally identified (step 335). Documents can be identified based on conventional search techniques. For example, terms of the search query can be used as keywords to query a conventional search engine of the corpus of documents. Alternatively, the topic (or identity) specified by terms of the search query can be used to identify documents associated with the topic or identity.

Using the identity, the system identifies topics associated with the identity (step 345). Using the identified documents, the system identifies topics associated with the given identity. Given that the identified documents are all related to the given identity, any topic associated with the documents are thus associated with the identity.

In some implementations, a first topic ranks more highly than a second topic if the first topic is associated with more documents. In other implementations, the system determines a composite score for each topic. The composite score of a topic is based on the score of each topic-association related to the topic (e.g., a sum of topic-association scores). The composite score is further based on the score of identity-associations related to the given topic. The composite score of a topic t, given an identity i, is derived using the same formula as given above. In some implementations, where topics and identities are associated directly, the composite score can be derived by adding the scores of all such direct associations that each include both the term and the identity.

For example, in FIG. 4, in response to a search for 'Joe', the composite score for Joe's expertise in the database topic is 0.8 (as derived above). The composite score for associations between Joe and each topic of translation, machine learning and user interface would also be determined (e.g., 0.71, 0.24, and 0.42 respectively). The system sorts the topics associated with the identity based on their respective score (step 355). For example, the database topic would precede the translation topic, which would precede the user interface topic in order of their respective composite scores. In implementations where associations are not scored, topics are ordered based on the number of associations each topic has to the identity—in other words, the number of documents related to the identity that the topic is associated with. Such an approach is equivalent to presuming the score between all associations has a value of one. Thus, the database and translation topics would be ordered equivalently because both are associated with two documents associated with Joe.

In either case, the identified documents are optionally presented to a user in response to receiving the search query (step 360). The identities associated with the given topic are presented their respective order (step 370). Alternatively, if the search query specifies an identity, then associated topics associated with the given identity are presented in order. In some implementations, both the documents and identities (or topics) can be presented simultaneously in response to the query. In some implementations, in response to a search query specifying a topic, ordered identities are presented and for each presented identity, documents that are relevant to both the given topic and the identity are presented together (e.g., as a list of documents under each identity). Likewise, in response to a search query specifying an identity, ordered topics are presented and for each presented topic, documents that are relevant to both the given identity and the topic are presented together (e.g., as a list of documents under each topic). The presentation of search result is described in further detail in FIGS. 5 and 6. Given the manner in which the topic-associations and identity-associations are related and scored, identities that are presented in response to a topic represent experts of the given topic. Conversely, topics that are presented represent areas of expertise of the given identity.

Figure 5:
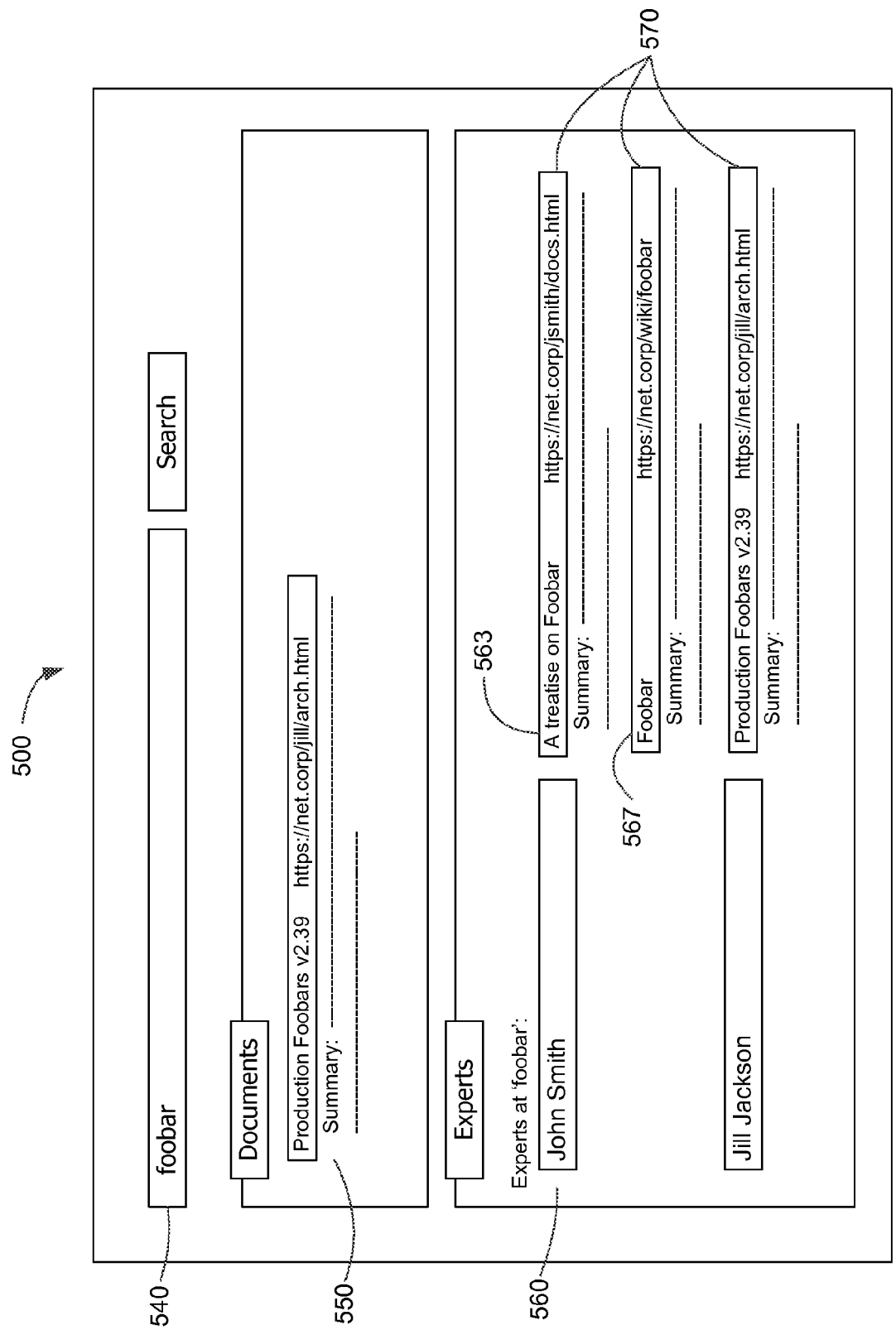
FIG. 5 is a diagram of an exemplary user interface for presenting identities.

FIG. 5 is a diagram of an exemplary user interface 500 for presenting topics. The user interface 500 includes a text box 540 for receiving user-specified search query. In general, a user can provide search query using a variety of input techniques. For example, the user may provide a search query by way of typing, a voice recognition system, or gesture recognizing vision system.

The exemplary user interface 500 is shown presenting information responsive to a previously provided search query. In this example the particular search query, "foobar" is recognized as associated with a particular topic. Documents satisfying the search query specified in the text box 540 are listed in a list of documents 550. The documents in the list of documents 550 can be any document satisfying the search criteria and the list can be generated by any convenient search technique e.g., a keyword search. A list of experts 560 is also presented, which includes a list of experts having expertise in the given topic associated with the search query.

For example, two identities are listed, John Smith and Jill Jackson. The list of experts 560 is used to present experts in order of their composite score with respect to the given topic. From the order shown, John Smith is presumed to have greater skill at foobar than Jill Jackson. In some implementations, each listed identity is used to access further information about the identity or to contact the identified person. In some implementations, each presented identity is a link to a profile or homepage of the person. In other implementations, each presented identity is a link to contact (e.g., by email or phone) the listed identity.

For each expert, a list of associated documents 570 is presented. The list of associated documents includes documents that are both associated with corresponding identities and relevant to the given topic. For example, both the first document 563 and the second document 567 have been at least partly authored by 'John Smith'. Each document is listed in order of the composite score of the document with respect to the given topic (e.g., 'foobar') and the particular identity (e.g., 'John Smith'). Moreover, from the presentation a user can easily infer, by virtue of the document's order, that the first document 563 is more relevant to the search query than the second document 567. Each listed document can be used to access further information about the document. For example, each the presentation of each document can be a hyperlink to the content of the document. In some implementations, the user interface 500 includes user interface elements for viewing additional search results (e.g., more experts, more documents related to the query, or more documents related to a particular identity). The number of experts, or the number of documents for each expert, that are presented can be specified by a user setting, user interface control or a pre-determined value.

Just as identities and relevant documents can be presented if the provided search query is identified as a topic, so too can topics and relevant documents be presented if the provided search query is identified as an identity.

Figure 6:
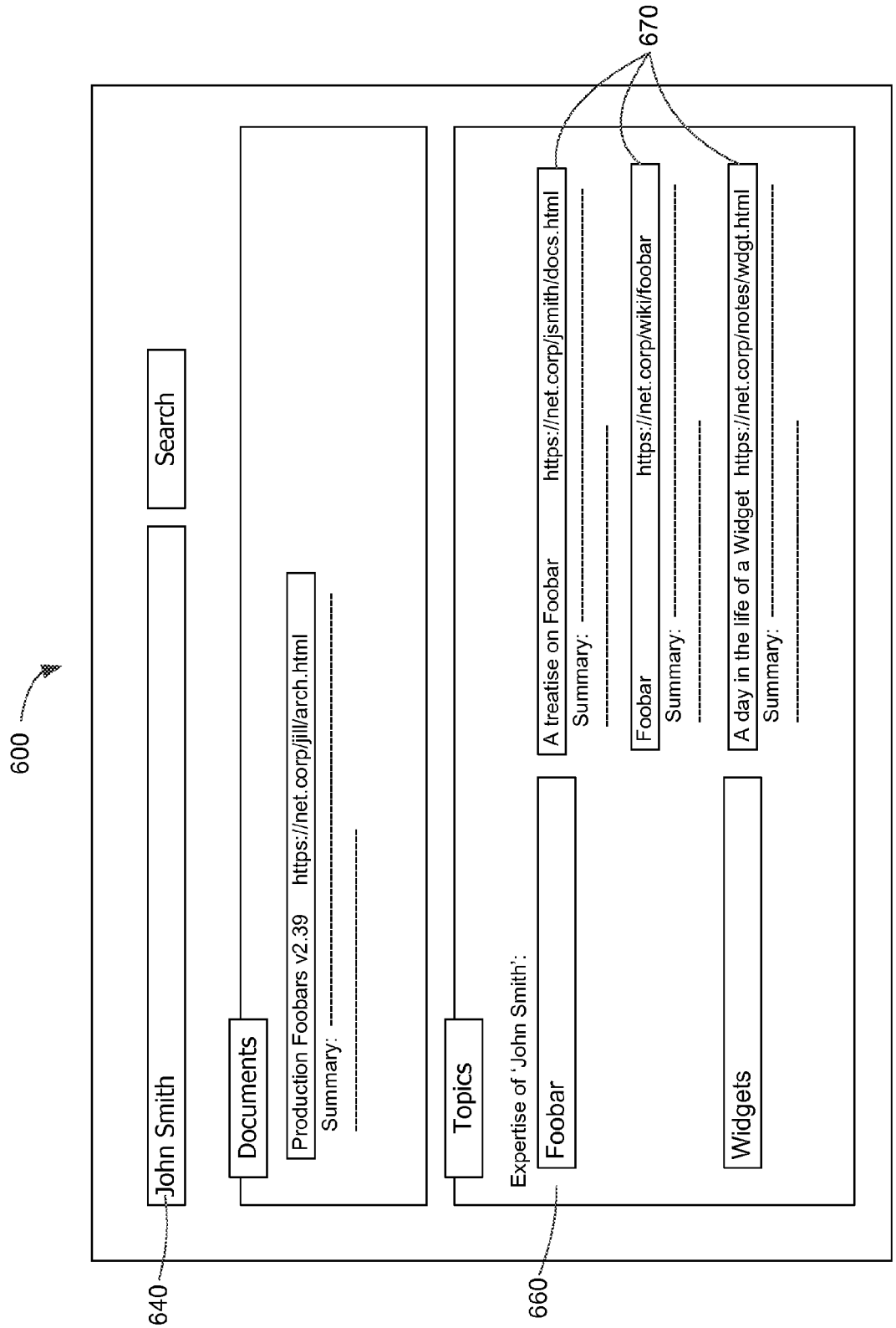
FIG. 6 is a diagram of an exemplary user interface for presenting topics.

FIG. 6 is a diagram of an exemplary user interface 600 for presenting topics, given an identity provided as a search term 640. In response to the given identity, the user interface 600 presents one or more topics 660, each of which can be presented with one or more documents 670 associated with the corresponding topic. Each of the topics represent areas of expertise of the given identity. The documents presented with each topic are documents associated with the topic and which the given identity helped to create.

Figure 7:
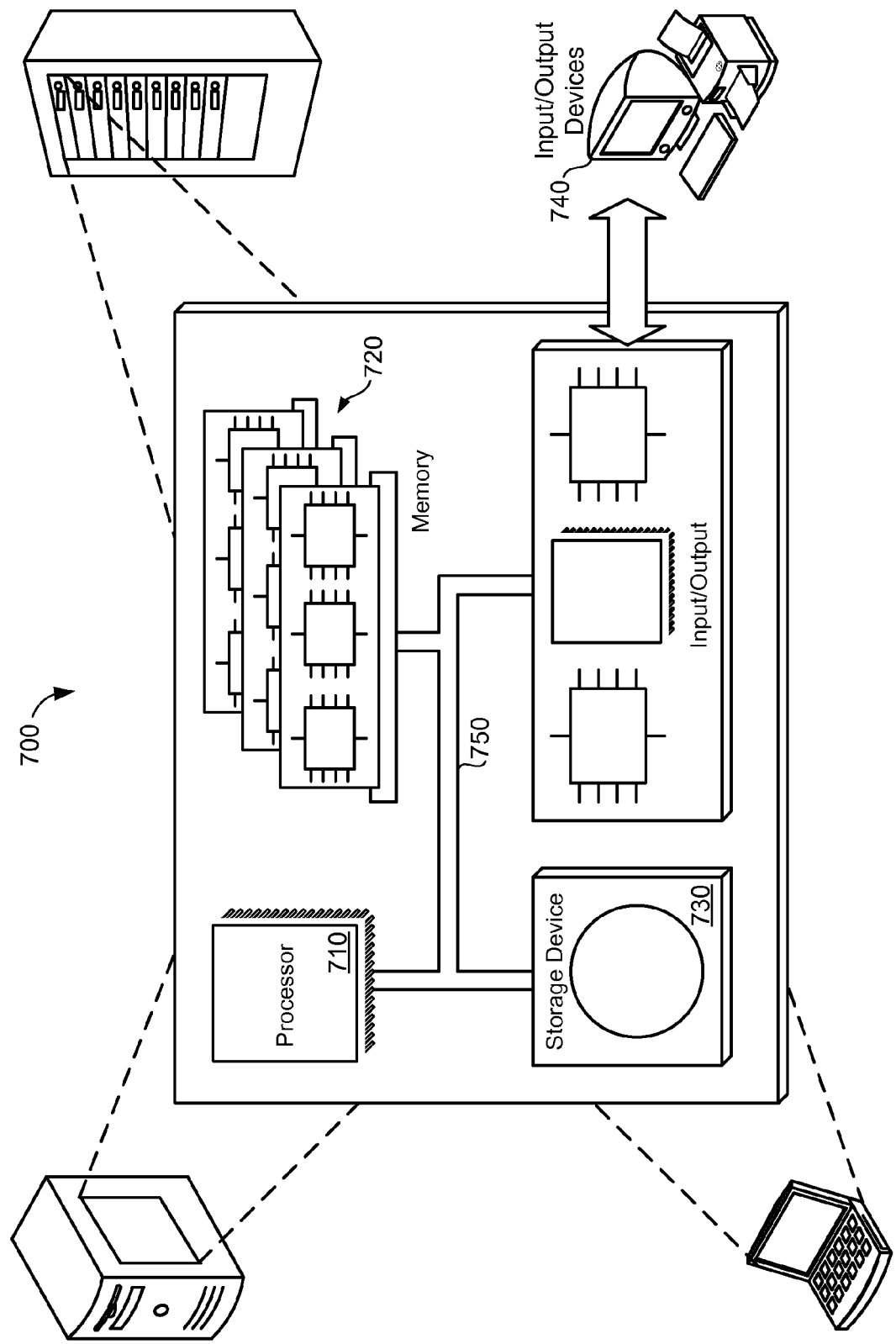
FIG. 7 is a block diagram of an exemplary computer system.

FIG. 7 is a block diagram of a generic computer system 700. An application execution environment can be run on the system 700, which will, in general, mediate access between applications running in the application execution environment and the parts of the system 700. The system 700 can be used for practicing operations described in association with the process 200 or the process 300. The system 700 can include a processor 710, a memory 720, a storage device 730, and an input/output device 740. Each of the components 710, 720, 730, and 740 are interconnected using a system bus 750. The processor 710 is capable of processing instructions for execution within the system 700. Such executed instructions can implement one or more components of the system 100 described in reference to FIG. 1, for example. In some implementations, the processor 710 is a single-threaded processor. In other implementations, the processor 710 is a multi-threaded processor or a multi-core processor. The processor 710 is capable of processing instructions stored in the memory 720 or on the storage device 730 to display graphical information for a user interface on the input/output device 740.

The memory 720 is a computer readable medium such as volatile or non volatile that stores information within the system 700. The memory 720 can store data structures representing topic-associations, identity-associations and the content of documents, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a plurality of identities stored in a repository of identities, each identity corresponding to an expert of one or more topics;
identifying a plurality of topics stored in a repository of information, each topic i) describing information included by a document of a corpus of documents and ii) distinguishing the document from the remaining documents of the corpus of documents, the plurality of topics including the one or more topics; and
processing each document in the corpus of documents, the processing including:
identifying one or more identities of the plurality of identities that occur within the document,
identify one or more topics of the plurality of topics that occur within the document,
for each identity that occurs within the document, determining, using one or more processors, an identity score for the identity with respect to the document, the identity score indicating a degree of relevance between the associated identity and the document, for each topic that occurs within the document, determining a topic score for the topic with respect to the document, the topic score indicating a degree of relevance between the associated topic and the document, identifying one or more combinations of i) the one or more identities that occur within the document, and ii) the one or more topics that occur within the document, for each identified combination, determining an aggregate score for the document based on the identity score associated with the combination for the document and the topic score associated with the combination for the document; and aggregating, for each identified combination, the aggregate score of each document of the corpus of documents for the identified combination to define a composite score of the identified combination across the corpus of documents.

2. The method of claim 1, where identifying a plurality of topics comprises:
identifying a plurality of n-grams from each document in the corpus of documents;
determining an inverse document frequency (IDF) score for each n-gram; and
sorting the n-grams by IDF score to identify topics corresponding to one or more of the n-grams.

3. The method of claim 1, where determining the identity score for the identity with respect to the document includes determining the identity score based on features of a reference to the identity occurring in the document.

4. The method of claim 3, where features of a reference to the identity include one or more of:
a location within the document of the reference; and
typographical properties of the reference.

5. The method of claim 1, where determining the identity score for the identity with respect to the document includes determining the identity score based on a frequency of references to the identity occurring in the document.

6. The method of claim 1, where determining the topic score for the topic with respect to the document includes determining the topic score based on features of occurrence of the topic in the document.

7. The method of claim 6, where features of an occurrence include one or more of:
a location within the document of the occurrence; and
typographical properties of the occurrence.

8. A method comprising:
receiving a search query;
determining, using one or more processors, that the search query matches an identity among a plurality of identities, each identity of the plurality of identities corresponding to an expert of one or more experts;
identifying multiple topics associated with the identity based on multiple documents in which the identity is referred, each topic of the multiple topics i) describing information included by a document of the multiple documents and ii) distinguishing the document from the remaining documents of the multiple documents;
for each document of the multiple documents, obtaining a composite score of each topic of the document based on an aggregation of aggregate scores of the topic for the document, the aggregate score of each topic based on an identity score associated with the document and a topic score of each topic associated with the document, the topic score for each topic indicating a degree of relevance between the topic and the document, and the identity score for the identity indicating a degree of relevance between the identity and the document;
ordering the multiple topics based on a respective composite score associated with each document of the multiple documents; and
presenting the multiple topics based on the ordering.

9. The method of claim 8, where presenting the multiple topics includes:
presenting, for each of the multiple topics, one or more of the multiple documents, the one or more of the multiple documents being documents most relevant to the corresponding topic.

10. The method of claim 8, further comprising:
identifying the plurality of identities from one or more directories.

11. A method comprising:
receiving a search query;
determining, using one or more processors, that the search query matches a topic among a plurality of topics, each topic of the plurality of topics i) describing information included by a document of multiple documents and ii) distinguishing the document from the remaining documents of the multiple documents;
identifying multiple identities associated with the topic based on multiple documents in which the topic is referred, each identity of the multiple identities corresponding to an expert of one or more experts;
for each document of the multiple documents, obtaining a composite score of each identity of the document based on an aggregation of aggregate scores of the identity for the document, the aggregate score of each identity based on a topic score associated with the document and an identity score of each identity associated with the document, the identity score for each identity indicating a degree of relevance between the identity and the document, and the topic score for the topic indicating a degree of relevance between the topic and the document;
ordering the multiple identities based on a respective composite score associated with each document of the multiple documents; and
presenting the multiple identities based on the ordering.

12. The method of claim 11, where presenting the multiple identities includes:
presenting, for each of the multiple identities, one or more of the multiple documents, the one or more of the multiple documents being documents most relevant to the corresponding identity.

13. The method of claim 11, further comprising:
identifying the plurality of topics from a corpus of documents.

14. A computer program product, encoded on a non-transitory computer-readable medium, operable to cause data processing apparatus to perform operations comprising:
identifying a plurality of identities stored in a repository of identities, each identity corresponding to an expert of one or more topics;
identifying a plurality of topics stored in a repository of information, each topic i) describing information included by a document of a corpus of documents and ii) distinguishing the document from the remaining documents of the corpus of documents, the plurality of topics including the one or more topics; and
processing each document in the corpus of documents, the processing including:
identifying one or more identities of the plurality of identities that occur within the document, identifying one or more topics of the plurality of topics that occur within the document, for each identity that occurs within the document, determining an identity score for the identity with respect to the document, the identity score indicating a degree of relevance between the associated identity and the document, for each topic that occurs within the document, determining a topic score for the topic with respect to the document, the topic score indicating a degree of relevance between the associated topic and the document, identifying one or more combinations of i) the one or more identities that occur within the document, and ii) the one or more topics that occur within the document, for each identified combination, determining an aggregate score for the document based on the identity score associated with the combination for the document and the topic score associated with the combination for the document; and aggregating, for each identified combination, the aggregate score of each document of the corpus of documents for the identified combination to define a composite score of the identified combination across the corpus of documents.

15. The program product of claim 14, where identifying a plurality of topics comprises:
  identifying a plurality of n-grams from each document in the corpus of documents;
  determining an inverse document frequency (IDF) score for each n-gram; and
  sorting the n-grams by IDF score to identify topics corresponding to one or more of the n-grams.

16. The program product of claim 14, where determining the identity score for the identity with respect to the document includes determining the identity score based on features of a reference to the identity occurring in the document.

17. The program product of claim 16, where features of a reference to the identity include one or more of:
  a location within the document of the reference; and
  typographical properties of the reference.

18. The program product of claim 14, where determining the identity score for the identity with respect to the document includes determining the identity score based on a frequency of references to the identity occurring in the document.

19. The program product of claim 14, where determining the topic score for the topic with respect to the document includes determining the topic score based on features of occurrence of the topic in the document.

20. The program product of claim 19, where features of an occurrence include one or more of:
  a location within the document of the occurrence; and
  typographical properties of the occurrence.

21. A computer program product, encoded on a non-transitory computer-readable medium, operable to cause data processing apparatus to perform operations comprising:
  receiving a search query;
  determining that the search query matches an identity among a plurality of identities, each identity of the plurality of identities corresponding to an expert of one or more experts;
  identifying multiple topics associated with the identity based on multiple documents in which the identity is referred, each topic of the multiple topics i) describing information included by a document of the multiple documents and ii) distinguishing the document from the remaining documents of the multiple documents;
  for each document of the multiple documents, obtaining a composite score of each topic of the document based on an aggregation of aggregate scores of the topic for the document, the aggregate score of each topic based on an identity score associated with the document and a topic score of each topic associated with the document, the topic score for each topic indicating a degree of relevance between the topic and the document, and the identity score for the identity indicating a degree of relevance between the identity and the document;
  ordering the multiple topics based on a respective composite score associated with each document of the multiple documents; and
  presenting the multiple topics based on the ordering.

22. The program product of claim 21, where presenting the multiple topics includes:
  presenting, for each of the multiple topics, one or more of the multiple documents, the one or more of the multiple documents being documents most relevant to the corresponding topic.

23. The program product of claim 21, further operable to cause data processing apparatus to perform operations comprising:
  identifying the plurality of identities from one or more directories.

24. A computer program product, encoded on a non-transitory computer-readable medium, operable to cause data processing apparatus to perform operations comprising:
  receiving a search query;
  determining that the search query matches a topic among a plurality of topics, each topic of the plurality of topics i) describing information included by a document of multiple documents and ii) distinguishing the document from the remaining documents of the multiple documents;
  identifying multiple identities associated with the topic based on multiple documents in which the topic is referred, each identity of the multiple identities corresponding to an expert of one or more experts;
  for each document of the multiple documents, obtaining a composite score of each identity of the document based on an aggregation of aggregate scores of the identity for the document, the aggregate score of each identity based on a topic score associated with the document and an identity score of each identity associated with the document, the identity score for each identity indicating a degree of relevance between the identity and the document, and the topic score for the topic indicating a degree of relevance between the topic and the document;
  ordering the multiple identities based on a respective composite score associated with each document of the multiple documents; and
  presenting the multiple identities based on the ordering.

25. The program product of claim 24, where presenting the multiple identities includes:
  presenting, for each of the multiple identities, one or more of the multiple documents, the one or more of the multiple documents being documents most relevant to the corresponding identity.

26. The program product of claim 24, further operable to cause data processing apparatus to perform operations comprising:
  identifying the plurality of topics from a corpus of documents.

27. A system comprising:
one or more processors configured to perform operations including:
identifying a plurality of identities stored in a repository of identities, each identity corresponding to an expert of one or more topics;
identifying a plurality of topics stored in a repository of information, each topic i) describing information included b a document of a corpus of documents and ii) distinguishing the document from the remaining documents of the corpus of documents, the plurality of topics including the one or more topics; and
processing each document in the corpus of documents, the processing including:
means for identifying one or more identities of the plurality of identities that occur within the document,
means for identifying one or more topics of the plurality of topics that occur within the document,
for each identity occurring within the document, means for determining an identity score for the identity with respect to the document, the identity score indicating a degree of relevance between the associated identity and the document,
for each topic occurring within the document, means for determining a topic score for the topic with respect to the document, the topic score indicating a degree of relevance between the associated topic and the document,
means for identifying one or more combinations of i) the one or more identities that occur within the document, and ii) the one or more topics that occur within the document,
for each identified combination, means for determining an aggregate score for the document based on the identity score associated with the combination for the document and the topic score associated with the combination for the document; and
means for aggregating, for each identified combination, the aggregate score of each document of the corpus of documents for the identified combination to define a composite score of the identified combination across the corpus of documents.

28. The system of claim 26, where identifying a plurality of topics comprises:
identifying a plurality of n-grams from each document in the corpus of documents;
determining an inverse document frequency (IDF) score for each n-gram; and
sorting the n-grams by IDF score to identify topics corresponding to one or more of the n-grams.

29. The system of claim 26, where determining the identity score for the identity with respect to the document includes determining the identity score based on features of a reference to the identity occurring in the document.

30. The system of claim 29, where features of a reference to the identity include one or more of:
a location within the document of the reference; and
typographical properties of the reference.

31. The system of claim 26, where determining the identity score for the identity with respect to the document includes determining the identity score based on a frequency of references to the identity occurring in the document.

32. The system of claim 26, where determining the topic score for the topic with respect to the document includes determining the topic score based on features of occurrence of the topic in the document.

33. The system of claim 32, where features of an occurrence include one or more of:
a location within the document of the occurrence; and
typographical properties of the occurrence.

34. A system comprising:
one or more processors configured to perform operations including:
receiving a search query;
determining that the search query matches an identity among a plurality of identities, each identity of the plurality of identities corresponding to an expert of one or more experts;
identifying multiple topics associated with the identity based on multiple documents in which the identity is referred, each topic of the multiple topics i) describing information included by a document of the multiple documents and ii) distinguishing the document from the remaining documents of the multiple documents;
for each document of the multiple documents, obtaining a composite score of each topic of the document based on an aggregation of aggregate scores of the topic for the document, the aggregate score of each topic based on an identity score associated with the document and a topic score of each topic associated with the document, the topic score for each topic indicating a degree of relevance between the topic and the document, and the identity score for the identity indicating a degree of relevance between the identity and the document;
ordering the multiple topics based on a respective composite score associated with each document of the multiple documents; and
presenting the multiple topics based on the ordering.

35. The system of claim 34, where presenting the multiple topics includes:
presenting, for each of the multiple topics, one or more of the multiple documents, the one or more of the multiple documents being documents most relevant to the corresponding topic.

36. The system of claim 34, wherein the operations further comprise:
identifying the plurality of identities from one or more directories.

37. A system comprising:
one or more processors configured to perform operations including:
receiving a search query;
determining that the search query matches a topic among a plurality of topics, each topic of the plurality of topics i) describing information included by a document of multiple documents and ii) distinguishing the document from the remaining documents of the multiple documents;
identifying multiple identities associated with the topic based on multiple documents in which the topic is referred, each identity of the multiple identities corresponding to an expert of one or more experts;
for each document of the multiple documents, obtaining a composite score of each identity of the document based on an aggregation of aggregate scores of the identity for the document, the aggregate score of each identity based on a topic score associated with the document and an identity score of each identity associated with the document, the identity score for each identity indicating a degree of relevance between the identity and the document, and the topic score for the topic indicating a degree of relevance between the topic and the document;

ordering the multiple identities based on a respective composite score associated with each document of the multiple documents; and presenting the multiple identities based on the ordering.

38. The system of claim 37, where presenting the multiple identities includes:

presenting, for each of the multiple identities, one or more of the multiple documents, the one or more of the multiple documents being documents most relevant to the corresponding identity.

39. The system of claim 37, wherein the operations further comprise:

identifying the plurality of topics from a corpus of documents.

40. The method of claim 1, wherein for each identified combination, multiplying the identity score associated with the combination for the document and the topic score associated with the combination for the document.

41. The method of claim 8, wherein the aggregate score of each topic for each document is a product of the topic score of the topic associated with the document and the identity score associated with the document.

42. The method of claim 11, wherein aggregate score of each topic for each document is a product of the topic score of the topic associated with the document and the identity score associated with the document.

* * * * *